(12) United States Patent
Hill

(10) Patent No.: US 6,550,005 B1
(45) Date of Patent: Apr. 15, 2003

(54) MECHANISM FOR RECOVERY FROM TERMINATION OF A PROGRAM INSTRUCTION DUE TO AN EXCEPTION IN A PIPELAND PROCESSING SYSTEM

(75) Inventor: Stephen John Hill, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/449,867

(22) Filed: Nov. 29, 1999

(51) Int. Cl.[7] .............................. G06F 9/30; G06F 9/38; G06F 9/44

(52) U.S. Cl. .................. 712/245; 712/226; 712/219; 712/227; 714/17

(58) Field of Search .......................... 713/323, 322, 713/321; 712/227, 245, 228, 219, 244, 226; 714/17, 24, 15

(56) References Cited

U.S. PATENT DOCUMENTS 4,907,150 A * 3/1990 Arroyo et al. ............. 713/323
5,203,003 A * 4/1993 Donner ...................... 713/322

* cited by examiner

Primary Examiner—Daniel H. Pan
(74) Attorney, Agent, or Firm—Nixon & Vanderhye P.C.

(57) ABSTRACT

Apparatus (5) and method for processing data in response to a sequence of program instructions including a primary pipelined processing unit (40) for performing data processing, the primary pipelined processing unit being responsive to a cancellation condition such as an abort to cancel processing of a partially completed program instruction. The apparatus and method comprising a pseudo instruction generator (30) to generate a pseudo instruction to a fix-up pipelined processing unit (50) in response to a program instruction (LDM, STM) that can be subject to cancellation, the pseudo instruction controlling the fix-up pipelined processing unit to produce a state in which the partially completed program instruction may be re-executed at a later time.

19 Claims, 1 Drawing Sheet

MECHANISM FOR RECOVERY FROM TERMINATION OF A PROGRAM INSTRUCTION DUE TO AN EXCEPTION IN A PIPELAND PROCESSING SYSTEM

BACKGROUND OF THE INVENTION

1. Field of the Invention

This invention relates to an apparatus and method for processing data in response to a sequence of program instructions at least one of which may be subject to cancellation.

2. Description of the Prior Art

In some pipelined CPUs an instruction can be cancelled before the point at which it would usually have finished. One condition which causes this behaviour is a memory access fault otherwise known as an abort. An abort is signaled when some intervention by the operating system is required. e.g. in a demand paged virtual memory system an abort is signaled when an attempt is made to access data which does not currently reside in the main memory of the system. Only after the operating system has moved the data into memory can the access be completed.

Typically an abort will simply cause the instruction which aborted to be cancelled and the instruction stream to be changed to execute a software abort handler. Once the abort handler has fixed the cause of the abort the instruction stream is switched back to the aborted instruction which will be re-executed.

As the aborted instruction has been partially executed before the abort is signaled and it was cancelled, it is vital that any state which the instruction has updated before the abort occurred does not prevent correct re-execution of the instruction.

For example, many instruction sets include instructions which load a register from an address calculated by summing the contents of a register holding a base address and a register holding a offset address. Often there is an option to write back to the register holding the base address the sum of its original contents plus the contents of the offset address. In this case the instruction will write to both the loaded register and the base register. In the event that a load aborts, the correct data is not available to be written into the loaded register. However, incorrect data can safely be written as it will be replaced by the correct value when the instruction is re-executed.

The same is not, however, true for the write to the base register. The base address register is read by the instruction as well as written by it, so when the instruction is re-executed it must contain the original value or the load will occur from the wrong address. Although the signal that an access has aborted is often a late arriving signal, in most systems it does arrive in time for the base register write to be averted.

Another example is concerned with instruction sets that include a load-multiple instruction which will load a set of registers from consecutive memory locations starting from an address specified in a base register. Often these instructions take many cycle to execute as they load data into successive registers in the specified set.

In some systems it is possible for an abort to occur on any of the accesses caused by the instruction. Normally this does not cause any additional difficulty as all the registers can be safely reloaded upon re-execution of the instruction. However at least two potentially difficult cases do exist:

a) the base writeback case analogous to the previous example;

b) the base register is also a member of the set of registers which is to be loaded—in this case the load to the base register may occur several cycles before an abort happens on a latter member of the set of registers to be loaded.

Case (a) is typically dealt with by delaying the base register writeback until it is know that no further aborts can occur for the instruction. If an abort does occur then the writeback is cancelled.

It is harder to deal with case (b) in the same manner as this would require that the order of the loads was shuffled to make the base register load occur last of all. One more practical way to deal with case (b) is to provide dedicated hardware to preserve a copy of the original base register upon starting the instruction up to a point where an abort can no longer occur. This copy is used to restore the original value if an abort does occur.

A problem with this approach is that the dedicated hardware tends to disadvantageously increase the circuit size and complexity.

It should be noted that the situations detailed above are merely examples and that similar problems may occur with other instructions as well as loads and for other cancellations as well as aborts.

SUMMARY OF THE INVENTION

Viewed from one aspect the present invention provides an apparatus for processing data in response to a sequence of program instructions, said apparatus comprising: a primary pipelined processing unit for performing data processing, said primary pipelined processing unit being responsive to a cancellation condition to cancel processing of a partially completed cancellable program instruction; a fix-up pipelined processing unit; and a pseudo instruction generator responsive to at least one cancellable program instruction that can be subject to cancellation to generate a cancellation fix-up instruction that is issued to said fix-up pipelined processing unit, said cancellation fix-up instruction being operable upon occurrence of a cancellation condition to control said fix-up pipelined processing unit to produce a state in which said partially completed program cancellable instruction may be re-executed at a later time.

The apparatus of the present invention recognises the above problem and addresses the problem by providing an apparatus to handle cancellation of program instructions and to restore the apparatus to a state in which the program instruction can be re-executed without, for example, storing the original value of the base address in separate specially provided and controlled hardware. It does this by using a pseudo-instruction to deal with cancellation, the pseudo-instruction being fed down a pipeline of a fix-up processing unit in the same way as any other instruction. This means that much of the interlock and forwarding logic of the pipelined processor can be re-used to handle cancellation thereby reducing the need for dedicated special purpose logic. Thus, if an abort occurs the normal instruction will be cancelled, while the fix up pseudo instruction will only complete in such a case.

The advantages of the present invention become greater as machines are adapted to launch more instructions at once and do more out of order execution. In such machines a cancellation fix-up pseudo-instruction allows almost the same hardware which deals with execution order and forwarding for standard instructions to deal with keeping the cancellation fix-up in the right place in the order. This would otherwise become an increasingly difficult task for dedicated special purpose hardware.

Advantageously, said pseudo instruction generator is operable to generate a fix-up instruction only when said cancellable program instruction comprises an instruction to overwrite the contents of a base register containing a base address for a data processing operation specified by said cancellable instruction.

Many instructions that are cancelled when partially completed can simply be re-executed without any problems. With other instructions which involve the changing of a value in the base register which is used as an address in the instruction re-execution of a partially completed instruction may give the wrong result as the base address register which is used by the instruction may have been changed. By differentiating between these two sets of instructions and only producing a fix-up instruction in the cases where re-execution may be a problem, this embodiment of the present invention provides an efficient way of dealing with these different situations.

In preferred embodiments, said pseudo instruction generator is operable in response to a cancellable program instruction that overwrites the contents of a base register containing a base address for a data processing operation specified by said cancellable instruction to generate a cancellation fix-up instruction that reads an initial value from said base register prior to it being overwritten.

By issuing a pseudo instruction to read the base address such embodiments can restore the apparatus to its original state even in the case of a cancellation to an instruction occurring after the base address storage means has been overwritten. The use of the pseudo instruction to read the base address storage means results in the value travelling down the pipeline in the fix-up processing unit with the pseudo instruction thereby obviating the need for a special register and control logic to store the value.

In some embodiments if said cancellable instruction is one that calculates a writeback value to be stored in said base register, then a completion writeback instruction is generated that controls said fix-up pipelined processing unit to calculate said writeback value and to only perform said writeback to said base register upon detection that cancellation conditions for said at least one program instruction are no longer possible.

A writeback instruction is an instruction that writes the base address register with the result of the address calculated by a memory operation with base-register-update. By permitting the writeback to occur after it is established that no early termination of the program instruction will occur, any delay associated with the deferring of the writeback can be reduced.

In preferred embodiments of the invention program instructions that both overwrite the contents of a base register and calculate a writeback value to said base register are not permitted such that said fix-up pipelined processing unit is available to process either a cancellation fix-up instruction that reads an initial value of a completion writeback instruction that calculates a writeback value.

Not permitting program instructions that overwrite the contents of a base register and that calculate a writeback value to that base register avoids potentially damaging register write conflicts and has the result that the fix-up pipelined processing unit will be available to handle either the cancellation fix-up instruction or the completion writeback instruction.

In the case where the program instruction to overwrite said base address storage means is an instruction that needs to be fully completed before it is known if a cancellation condition will occur or not, said cancellation fix-up instruction is operable to overwrite said base register with said initial value in response to detection of said cancellation condition.

The use of the pseudo instruction to restore the base address value to its original value means that the pipeline logic needs little alteration to handle cancellations, such as aborts, that occur after the base address has been overwritten.

Advantageously, upon detection that no cancellation of said cancellable program instruction will occur, said cancellation fix-up instruction is cancelled.

The cancellation of the fix-up instruction at this point means that the fix-up processing unit can advance to the next instruction; the fix-up instruction having had no effect on the processor state.

Embodiments of the present invention are particularly well suited to alleviate cancellation problems associated with block memory access instructions and, in particular, block loads from memory that include a base address writeback or where the base address register is in the load list and/or block stores to memory including a base address writeback.

In such cases, the primary pipelined processing unit may be a load store unit and the fix-up pipelined processing unit may be an arithmetic logic unit, that may also calculates any writeback address. In other embodiments the fix-up unit may be a different type of execution unit.

In some embodiments said primary pipelined processing unit comprises said fix-up pipelined processing unit, whereas in other embodiments, such as in superscaler systems, the two units are separate units and the fixed up unit is not special hardware but is any execution unit that is available at the time now.

In preferred embodiments, if said cancellable program instruction is a block memory access instruction to memory locations specified by a base address value stored in a base address register and said cancellable program instruction does not involve writing to said base register, then said cancellation fix-up instruction is a no-operation instruction, said no-operation instruction serving to prevent subsequent instructions from being executed by said apparatus until the abort status of said block memory access instruction is resolved.

Although it would be possible that when the program instruction does not instruct the overwriting of the base address register the fix-up pipelined processing unit could be used for other calculations, it is preferred that a NOP instruction is entered into the fix-up pipelined processing unit as this reduces any alterations required to the interlock and forwarding logic. Furthermore, by having different pseudo-instructions for different situations, the decoder can behave in the same way for all these cases. This helps keep the decoder simple and fast.

Advantageously said pseudo-instruction generator is operable to issue said fix-up instruction to said fix-up pipelined processing unit at the same time that said primary pipelined processing unit receives a data processing instruction.

Thus, the instructions run in parallel down their respective pipelines simplifying the control of the system.

Although the apparatus of the present invention can respond to any cancellation condition it is particularly well adapted to handle aborts.

A further aspect of the present invention provides a method of processing data in response to a sequence of program instructions, comprising the steps of: issuing a cancellable program instruction that can be subject to cancellation to a primary pipelined processing unit for performing data processing, said primary pipelined processing unit being responsive to a cancellation condition to cancel processing of a partially completed cancellable program instruction; generating a cancellation fix-up instruction with a pseudo instruction generator in response to said cancellable program instruction and issuing said cancellation fix-up instruction to a fix-up pipelined processing unit, said cancellation fix-up instruction being operable upon occurrence of a cancellation condition to control said fix-up pipelined processing unit to produce a state in which said partially completed cancellable program instruction may be re-executed at a later time.

BRIEF DESCRIPTION OF THE DRAWING

An embodiment of the present invention will now be described, by way of example only, with reference to the accompanying drawing, in which.

DESCRIPTION OF THE PREFERRED EMBODIMENTS

Figure 1:
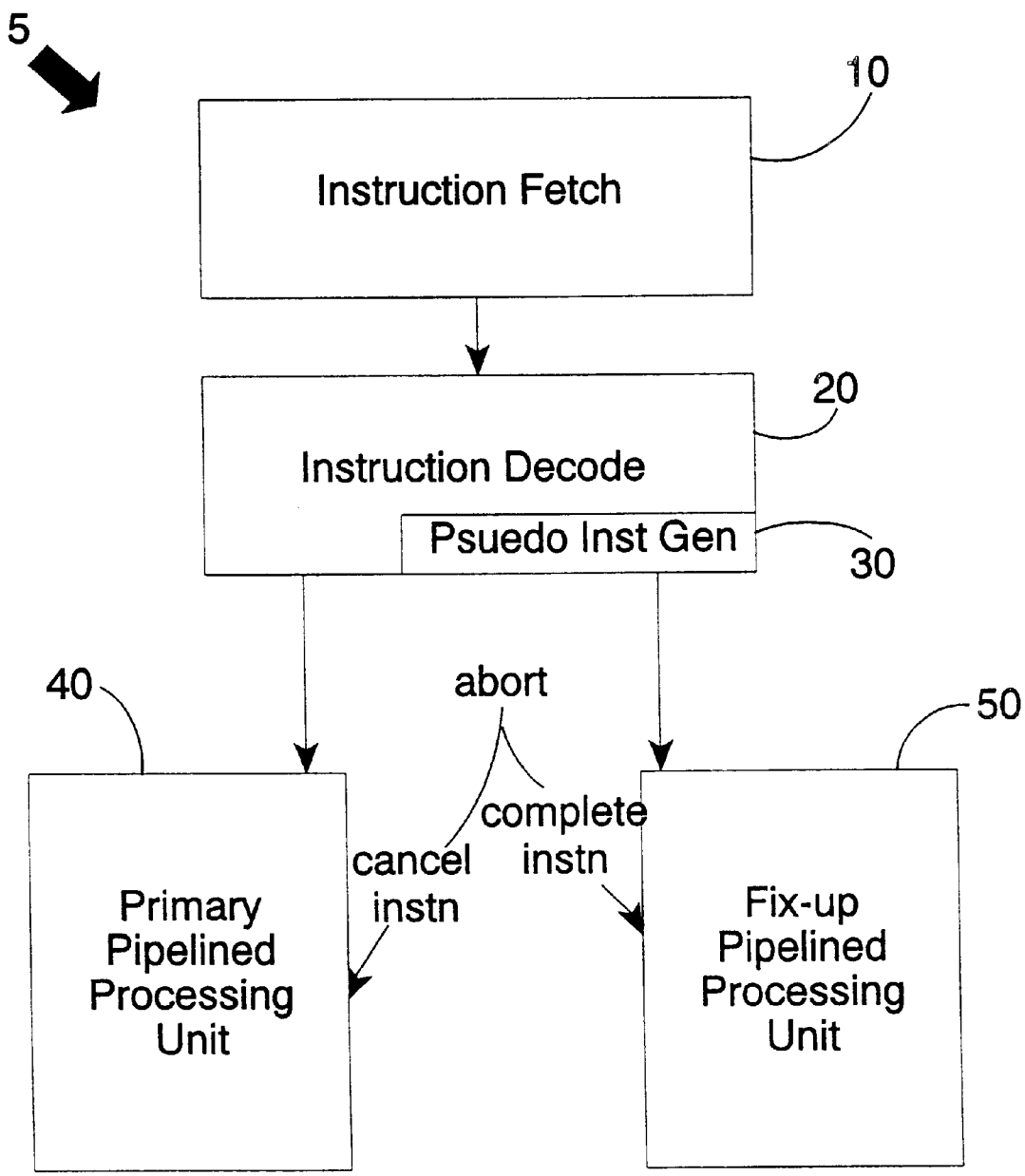
FIG. 1 illustrates a schematic diagram of an apparatus according to an example embodiment of the invention.

With reference to FIG. 1, an apparatus 5 for processing data in response to a sequence of program instructions is illustrated. The apparatus 5 has an instruction fetch unit 10, an instruction decode unit 20, including a pseudo instruction generator 30, a primary pipelined processor 40 and a fix-up pipelined processor 50. The apparatus 5 may include many more pipelined processing units.

A pseudo instruction may be viewed as some subset of the state in a microprocessor or similar apparatus which does not come directly from decoding an instruction in a program but which causes behavior elsewhere in the apparatus as if it had come directly from an instruction. It can be distinguished from the second or latter cycles of a multi-cycle instruction in that it behaves as a separate instruction and can be issued to separate pipelines for completion where they are available. That is to say, a pseudo instruction is one where some parts of the machine will know a given operation is not directly a result of decoding an instruction from a program although they use exactly the same mechanism to communicate to the rest of the machine as they would had the operation been caused by decoding an instruction from a program. For example, a pseudo instruction is different from, say, the second cycle of a two cycle multiply in that it behaves as an independent instruction and can be issued to separate pipelines for completion if such pipelines exist.

In operation a program instruction is fetched by the instruction fetch unit 10 and is then passed to the instruction decoder 20. The instruction decoder 20 includes a pseudo instruction generator 30, which, in response to a program instruction that can be subject to cancellation (i.e. a cancellable program instruction), generates a cancellation fix-up instruction. The fix-up instruction is issued to fix-up pipelined processing unit 50. At the same time that the instruction decoder 20 issues the decoded program instruction to the primary processor 40, the fix-up instruction is issued to the fix-up pipelined processing unit 50. The types of cancellation with which embodiments of the present invention can deal include aborts and interrupts, however, in the following discussion aborts will be considered.

The form of the cancellation fix-up instruction generated by the pseudo instruction generator 30 depends on the received program instruction being decoded. If the program instruction causes a load of data over the contents of the base address register, then the pseudo instruction generator 30 generates a cancellation fix-up instruction comprising an instruction to read the base address register (which clearly takes place before the loaded data overwrites it) and to write this value back to the base address register.

The pseudo instruction is recognised and is only allowed to complete it's write if an abort condition occurs. Previous instructions will forward to the fix up instructions the read of the base register. The write from the fixup instruction is never forwarded to following instructions. The base write from the load instruction is forwarded to following instructions. Once the pseudo instruction is progressing down the rest of the pipeline it is likely that the interlocks required for normal execution will prevent it from writing the base fix up value before the load instruction has passed the point where an abort can occur. If this is not the case then some minor modifications of the interlock will be needed to make this the case.

At the end of the execution by the primary pipelined processing unit 40, the fix-up pipelined processor 50 must determine whether or not to go ahead with a write to the base address register. If the instruction in the write stage of the pipe is a fix up instruction and an abort occurred, or the instruction in the write stage of the pipe is not a fix up instruction and an abort did not occur then the write is performed. Thus, the write can be controlled by an exclusive NOR of the abort signal and the fix up instruction. It should be noted that in the case of the write for the fix up instruction when an abort has occurred, the original value read from the base address register is written, whereas in the case of the non abort write the write back value calculated in the ALU pipe is written.

Operation of the data processing apparatus of an embodiment of the present invention in response to certain block memory access instructions will now be considered.

In an ARM10 processor (as designed by ARM Limited, Cambridge, England) the integer pipe (ALU) is used to calculate any writeback value in parallel with the load-store unit calculating the address for the access. Thus, at the same time as a load or store instruction is issued to the load-store unit (primary pipelined processing unit) a writeback calculation is issued to the integer unit (which also serves as the fix-up pipelined processing unit). For LDMs (block data loads from memory) and STMs (block data stores to memory) the integer unit is only needed in the first cycle, after this the load-store unit operates independently. An exception to this appears when it is possible for an access to be cancelled but it is not yet known if it will or not. In this case any writeback, and thus any subsequent instructions, must be held up until it is detected whether an cancellation will occur.

For example, with the instruction LDM R0!{R1–R7} (load the registers R1 to R7 with data from the memory locations starting from the address in register R0 and then writeback the final address to R0), if it is possible for the load to be cancelled then the writeback to R0 will be held up until this matter is fully resolved. Of course, if it is not possible for the LDM to be cancelled then the writeback to R0 may go ahead.

A particularly difficult situation occurs when the base register is in the list (e.g. LDM R0{R0–R7}), in such a case the load to the base register has to be prevented until the presence or absence of a cancellation, such as an abort condition, has been determined. This can be particularly difficult in some cases such as, LDM R2{R1–R14} where the load of R13 aborts. In this case R2 is in the list and we know it may abort so we can't run any instructions in parallel. However, we still have to continue with the LDM and as R2 is near the start of the list we overwrite it before we see the abort.

First of all we shall consider a block load memory instruction in which the base address register is in the load list e.g. LDM R2{R0–R13}. In this case the pseudo instruction generator generates a cancellation fix-up instruction which reads the base address register and it tags this instruction. This is then issued to the ALU pipeline, where detection of the tag causes the read base address value to be passed through the execute stage unchanged. At the end of the memory access instruction (LDM), if an abort has been detected then the base address register value is restored using the value read in the read stage of the ALU pipeline, otherwise the ALU pipeline does nothing.

In the case of a block load or store memory instruction including base address register write back, e.g. STM R0!{R1–R7}, the pseudo instruction generator generates a cancellation fix-up instruction with a read of the base address register. This is issued to the ALU pipeline. It is not tagged and in execute a write back value is calculated from the read value of the base address register, this write back value then travels down the pipeline. Base address register overwrite is then instructed when it is determined that no abort will occur. Thus, in the case of an abort not being possible early writeback occurs, whereas in the case where an abort may occur but does not, writeback occurs late. If an abort does occur, then the ALU pipeline does not writeback and thus the base address register does not need to be restored.

Finally in the case of a block load or store instruction in which the base address register is not overwritten, aborts may be dealt with using a cancellation fix-up instruction issued by the pseudo instruction generator in the form of a NOP.

Table 1 gives a summary of the different operations of the processing apparatus 5 in response to different multiple memory access instructions and different conditions.

TABLE 1

|  | Base register not in list | Base register in list |
| --- | --- | --- |
| Instruction sent down ALU pipeline | If no abort possible, normal writeback, else NOP | If abort possible, write original value of base register to base register, else NOP |
| Outcome if abort not possible | Writeback (if any) occurs early, then registers loaded | Early NOP on ALU, then base and others registers loaded |
| Outcome if abort possible but doesn't happen | Registers loaded; then writeback (if any) occurs late | Base and other registers loaded; then late NOP on ALU |
| Outcome if abort possible and happens | Registers loaded then no writeback | Base and other registers loaded then base register restored |

Although illustrative embodiments of the invention have been described in detail herein with reference to the accompanying drawing, it is to be understood that the invention is not limited to those precise embodiments, and that various changes and modifications can be effected therein by one skilled in the art without departing from the scope and spirit of the invention as defined by the appended claims.

What is claimed is:

1. Apparatus for processing data in response to a sequence of program instructions, said apparatus comprising:

a primary pipelined processing unit for performing data processing, said primary pipelined processing unit being responsive to a cancellation condition to cancel processing of a partially completed cancellable program instruction;

a fix-up pipelined processing unit; and a pseudo instruction generator responsive to at least one cancellable program instruction that is subject to cancellation to generate a cancellation fix-up instruction that is issued to said fix-up pipelined processing unit, said cancellation fix-up instruction being operable upon occurrence of a cancellation condition to control said fix-up pipelined processing unit to produce a state in which said partially completed cancellable program instruction is able to be re-executed at a later time.

2. Apparatus according to claim 1, wherein said primary pipelined processing unit is a load store unit.

3. Apparatus according to claim 1, wherein said fix-up pipelined processing unit is an arithmetic logic unit.

4. Apparatus according to claim 1, wherein said primary pipelined processing unit comprises said fix-up pipelined processing unit.

5. Apparatus according to claim 1, wherein said cancellation condition comprises an abort.

6. Apparatus for processing data in response to a sequence of program instructions, said apparatus comprising:

a primary pipelined processing unit for performing data processing, said primary pipelined processing unit being responsive to a cancellation condition to cancel processing of a partially completed cancellable program instruction;

a fix-up pipelined processing unit; and a pseudo instruction generator responsive to at least one cancellable program instruction that is subject to cancellation to generate a cancellation fix-up instruction that is issued to said fix-up pipelined processing unit, said cancellation fix-up instruction being operable upon occurrence of a cancellation condition to control said fix-up pipelined processing unit to produce a state in which said partially completed cancellable program instruction is able to be re-executed at a later time, wherein said pseudo instruction generator is operable to generate a fix-up instruction only when said cancellable program instruction comprises an instruction to overwrite the contents of a base register containing a base address for a data processing operation specified by said cancellable instruction.

7. Apparatus according to claim 6, wherein said cancellable program instruction comprises one of:

a block load from memory locations specified by said base address with a base address writeback of a new base address to said base register; and a block store to memory locations specified by said base address with a base address writeback of a new base address to said base register.

8. Apparatus for processing data in response to a sequence of program instructions, said apparatus comprising:

a primary pipelined processing unit for performing data processing, said primary pipelined processing unit being responsive to a cancellation condition to cancel processing of a partially completed cancellable program instruction;

a fix-up pipelined processing unit; and a pseudo instruction generator responsive to at least one cancellable program instruction that is subject to cancellation to generate a cancellation fix-up instruction that is issued to said fix-up pipelined processing unit, said cancellation fix-up instruction being operable upon occurrence of a cancellation condition to control said fix-up pipelined processing unit to produce a state in which said partially completed cancellable program instruction is able to be re-executed at a later time, wherein said pseudo instruction generator is operable in response to a cancellable program instruction that overwrites the contents of a base register containing a base address for a data processing operation specified by said cancellable instruction to generate a cancellation fix-up instruction that reads an initial value from said base register prior to it being overwritten.

9. Apparatus according to claim 8, wherein if said cancellable instruction is one that calculates a writeback value to be stored in said base register, then a completion writeback instruction is generated that controls said fix-up pipelined processing unit to calculate said writeback value and to only perform said writeback to said base register upon detection that cancellation conditions for said at least one program instruction are no longer possible.

10. Apparatus as claimed in claim 9, wherein program instructions that both overwrite the contents of a base register and calculate a writeback value to said base register are not permitted such that said fix-up pipelined processing unit is available to process either a cancellation fix-up instruction that reads an initial value of a completion writeback instruction that calculates a writeback value.

11. Apparatus according to claim 8, wherein said cancellation fix-up instruction is operable to overwrite said base register with said initial value in response to detection of said cancellation condition.

12. Apparatus according to claim 11, wherein said cancellable program instruction comprises a block load from memory locations specified by said base address wherein said base address register is overwritten with loaded data.

13. Apparatus according to claim 8, wherein said cancellable program instruction comprises a block memory access instruction.

14. Apparatus for processing data in response to a sequence of program instructions, said apparatus comprising:
a primary pipelined processing unit for performing data processing, said primary pipelined processing unit being responsive to a cancellation condition to cancel processing of a partially completed cancellable program instruction;
a fix-up pipelined processing unit; and
a pseudo instruction generator responsive to at least one cancellable program instruction that is subject to cancellation to generate a cancellation fix-up instruction that is issued to said fix-up pipelined processing unit, said cancellation fix-up instruction being operable upon occurrence of a cancellation condition to control said fix-up pipelined processing unit to produce a state in which said partially completed cancellable program instruction is able to be re-executed at a later time, wherein upon detection that no cancellation of said cancellable program instruction will occur, said cancellation fix-up instruction is cancelled.

15. Apparatus for processing data in response to a sequence of program instructions, said apparatus comprising:
a primary pipelined processing unit for performing data processing, said primary pipelined processing unit being responsive to a cancellation condition to cancel processing of a partially completed cancellable program instruction;
a fix-up pipelined processing unit; and
a pseudo instruction generator responsive to at least one cancellable program instruction that is subject to cancellation to generate a cancellation fix-up instruction that is issued to said fix-up pipelined processing unit, said cancellation fix-up instruction being operable upon occurrence of a cancellation condition to control said fix-up pipelined processing unit to produce a state in which said partially completed cancellable program instruction is able to be re-executed at a later time, wherein if said cancellable program instruction is a block memory access instruction to memory locations specified by a base address value stored in a base address register and said cancellable program instruction does not involve writing to said base register, then said cancellation fix-up instruction is a no-operation instruction, said no-operation instruction serving to prevent subsequent instructions from being executed by said apparatus until the abort status of said block memory access instruction is resolved.

16. Apparatus for processing data in response to a sequence of program instructions, said apparatus comprising:
a primary pipelined processing unit for performing data processing, said primary pipelined processing unit being responsive to a cancellation condition to cancel processing of a partially completed cancellable program instruction;
a fix-up pipelined processing unit; and
a pseudo instruction generator responsive to at least one cancellable program instruction that is subject to cancellation to generate a cancellation fix-up instruction that is issued to said fix-up pipelined processing unit, said cancellation fix-up instruction being operable upon occurrence of a cancellation condition to control said fix-up pipelined processing unit to produce a state in which said partially completed cancellable program instruction is able to be re-executed at a later time, wherein said pseudo-instruction generator is operable to issue said cancellation fix-up instruction to said fix-up pipelined processing unit in the same processing cycle that said primary pipelined processing unit receives said cancellable data processing instruction.

17. A method of processing data in response to a sequence of program instructions, comprising the steps of:
issuing a cancellable program instruction that can be subject to cancellation to a primary pipelined processing unit for performing data processing, said primary pipelined processing unit being responsive to a cancellation condition to cancel processing of a partially completed cancellable program instruction;
generating a cancellation fix-up instruction with a pseudo instruction generator in response to said cancellable program instruction and issuing said cancellation fix-up instruction to a fix-up pipelined processing unit, said cancellation fix-up instruction being operable upon occurrence of a cancellation condition to control said fix-up pipelined processing unit to produce a state in which said partially completed cancellable program instruction may be re-executed at a later time.

18. A method of processing data in response to a sequence of program instructions, comprising the steps of:
issuing a cancellable program instruction that can be subject to cancellation to a primary pipelined processing unit for performing data processing, said primary pipelined processing unit being responsive to a cancellation condition to cancel processing of a partially completed cancellable program instruction;

generating a cancellation fix-up instruction with a pseudo instruction generator in response to said cancellable program instruction, wherein said pseudo instruction generator is operable to generate a fix-up instruction only when said cancellable program instruction comprises an instruction to overwrite the contents of a base register containing a base address for a data processing operation specified by said cancellable instruction; and issuing said cancellation fix-up instruction to a fix-up pipelined processing unit, said cancellation fix-up instruction being operable upon occurrence of a cancellation condition to control said fix-up pipelined processing unit to produce a state in which said partially completed cancellable program instruction may be re-executed at a later time.

19. A method of processing data in response to a sequence of program instructions, comprising the steps of:

issuing a cancellable program instruction that can be subject to cancellation to a primary pipelined processing unit for performing data processing, said primary pipelined processing unit being responsive to a cancellation condition to cancel processing of a partially completed cancellable program instruction;

generating a cancellation fix-up instruction with a pseudo instruction generator in response to said cancellable program instruction, wherein said pseudo instruction generator is operable in response to a cancellable program instruction that overwrites the contents of a base register containing a base address for a data processing operation specified by said cancellable instruction to generate a cancellation fix-up instruction that reads an initial value from said base register prior to it being overwritten; and issuing said cancellation fix-up instruction to a fix-up pipelined processing unit, said cancellation fix-up instruction being operable upon occurrence of a cancellation condition to control said fix-up pipelined processing unit to produce a state in which said partially completed cancellable program instruction may be re-executed at a later time, wherein said cancellation fix-up instruction is operable to overwrite said base register with said initial value in response to detection of said cancellation condition.

\* \* \* \* \*